US010904307B2

(12) United States Patent
Sathyanarayana et al.

(10) Patent No.: US 10,904,307 B2
(45) Date of Patent: Jan. 26, 2021

(54) DISTRIBUTED MANAGEMENT OF LIVE STREAM STORAGE

(71) Applicant: Verizon Digital Media Services Inc., Dulles, VA (US)

(72) Inventors: Karthik Sathyanarayana, Cypress, CA (US); Harkeerat Singh Bedi, Los Angeles, CA (US); Derek Shiell, Los Angeles, CA (US); Robert J. Peters, Culver City, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 452 days.

(21) Appl. No.: 15/832,921

(22) Filed: Dec. 6, 2017

(65) Prior Publication Data

US 2018/0167434 A1    Jun. 14, 2018

Related U.S. Application Data

(60) Provisional application No. 62/434,274, filed on Dec. 14, 2016.

(51) Int. Cl.
*H04L 29/06* (2006.01)
*H04L 29/08* (2006.01)
*G06F 21/10* (2013.01)

(52) U.S. Cl.
CPC ............ *H04L 65/601* (2013.01); *G06F 21/10* (2013.01); *H04L 65/4069* (2013.01); *H04L 67/02* (2013.01); *H04L 67/146* (2013.01); *H04L 67/2852* (2013.01)

(58) Field of Classification Search
CPC ... H04L 65/601; H04L 65/4069; H04L 67/02; H04L 67/146; H04L 67/2852; G06F 21/10
USPC ....................................................... 709/219
See application file for complete search history.

(56) References Cited

U.S. PATENT DOCUMENTS

| 6,170,013 | B1 * | 1/2001 | Murata | ............... H04L 67/1095 |
| | | | | 709/229 |
| 6,978,284 | B2 * | 12/2005 | McBrearty | .............. G06F 16/10 |
| 7,274,658 | B2 * | 9/2007 | Bornstein | ............... H04L 45/00 |
| | | | | 370/227 |

(Continued)

*Primary Examiner* — David P Zarka
(74) *Attorney, Agent, or Firm* — Ansari Katiraei LLP; Arman Katiraei; Sadiq Ansari

(57) ABSTRACT

The solution distributes the management of stream segments from a central storage cluster to different edge servers that upload stream segments to and receive stream segments from the central storage cluster. Each edge server tracks the stream segments it has uploaded to the central storage cluster as well as the expiration times for those segments. The tracking is performed without a database using a log file and file system arrangement. First-tier directories are created in the file system for different expiration intervals. Entries under the first-tier directories track individual segments that expire within the expiration interval of the first-tier directory with the file system entries being files or a combination of subdirectories and files. Upon identifying expired stream segments, the edge servers instruct the central storage cluster to delete those stream segments. This removes the management overhead from the central storage cluster and implements the distributed management without a database.

12 Claims, 9 Drawing Sheets

(56) References Cited

U.S. PATENT DOCUMENTS

| | | | | |
|---|---|---|---|---|
| 7,359,955 | B2* | 4/2008 | Menon | H04L 29/06 |
| | | | | 709/219 |
| 7,590,747 | B2* | 9/2009 | Coates | G06F 3/0607 |
| | | | | 709/229 |
| 8,549,173 | B1* | 10/2013 | Wu | G06F 9/5016 |
| | | | | 370/235.1 |
| 9,178,928 | B2* | 11/2015 | Choi | H04L 65/4069 |
| 9,531,839 | B1* | 12/2016 | Wang | H04L 67/2842 |
| 9,560,312 | B2* | 1/2017 | Herzog | H04N 21/20 |
| 9,807,201 | B2* | 10/2017 | Okada | H04N 21/2547 |
| 9,811,590 | B1* | 11/2017 | Acharya | G06F 16/958 |
| 9,881,020 | B2* | 1/2018 | Ogura | G06F 16/162 |
| 9,912,710 | B2* | 3/2018 | Duerring | H04L 65/4069 |
| 10,114,882 | B2* | 10/2018 | Lipstone | G06F 16/437 |
| 10,313,473 | B2* | 6/2019 | Anand | H04L 67/2852 |
| 2008/0228920 | A1* | 9/2008 | Souders | H04L 67/2842 |
| | | | | 709/226 |
| 2014/0156798 | A1* | 6/2014 | Jasinskyj | H04L 43/0876 |
| | | | | 709/218 |
| 2014/0245359 | A1* | 8/2014 | De Foy | H04W 36/14 |
| | | | | 725/62 |
| 2015/0058439 | A1* | 2/2015 | Afergan | H04L 12/66 |
| | | | | 709/213 |
| 2016/0073149 | A1* | 3/2016 | Feng | H04N 21/6587 |
| | | | | 725/115 |
| 2016/0132668 | A1* | 5/2016 | Shimogawa | G06Q 30/04 |
| | | | | 726/29 |
| 2017/0091256 | A1* | 3/2017 | Gordon | G06F 3/0608 |
| 2017/0280178 | A1* | 9/2017 | Sun | H04L 47/286 |
| 2018/0097741 | A1* | 4/2018 | Gavade | H04N 21/2396 |

* cited by examiner

DISTRIBUTED MANAGEMENT OF LIVE STREAM STORAGE

CLAIM OF BENEFIT TO RELATED APPLICATIONS

This application claims the benefit of U.S. provisional application 62/434,274 entitled "Distributed Management of Live Stream Storage", filed Dec. 14, 2016. The contents of application 62/434,274 are hereby incorporated by reference.

BACKGROUND ART

The distribution of streaming content over a digital network, such as the Internet, continues to grow as stream providers continue the shift from traditional television broadcasting towards online distribution of their streaming content. This imposes additional burden on the distribution platforms tasked with the delivery of the streaming content.

A content delivery network (CDN) is a distributed platform to which different stream providers upload their streaming content. The streaming content is typically uploaded as a set of segments with each segment encoding a portion of the overall streaming content. The CDN deploys and manages the hardware and other resources which are used to distribute the uploaded stream segments to users in different regions on behalf of the stream providers. The stream providers can thereby focus on creating the streaming content and rely on the CDN for the online distribution of that streaming content to several thousand or even millions of viewers.

The CDN is formed by one or more points-of-presence (PoPs). The PoPs are located in different geographic regions. Each PoP has one or more nodes for receiving the streaming content, or more specifically, the encoded stream segments that form the streaming content, from the streaming providers and for distributing the stream segments to requesting end users. These nodes are typically edge servers that interface with the streaming providers and end users. This distributed architecture allows the CDN to distribute the loads associated with stream uploads and stream distribution across the different nodes forming the CDN. In other words, even though ten different streams may be uploaded to the CDN at a given moment, each of the streams may be uploaded through a different server in the same PoP or different server in a different PoP of the CDN.

However, any uploaded stream must be made available to the other servers of the CDN for distribution regardless of the CDN server that received the upload. Accordingly, the CDN provides a central storage cluster. The central storage cluster aggregates the streams that are uploaded through the various CDN PoPs. Should a CDN distribution server receive a request for a stream segment that is not in local cache, the CDN distribution server accesses the central storage cluster to retrieve the requested stream segment.

The performance of the central storage cluster is paramount to the streaming performance of the CDN. Should the central storage cluster suffer a bottleneck, the streaming performance across the CDN can be degraded. Accordingly, specialized and highly optimized storage solutions are used as the central storage.

Ceph is one example of such a specialized and highly optimized storage cluster. Ceph is based on the Reliable Autonomic Distributed Object Store (RADOS) and allows thousands of simultaneous hosts to access up to exabytes of data.

Even such a highly optimized storage cluster can become bottlenecked by the overhead associated with managing streaming content. Each time a stream segment is stored to the storage cluster, a record is created to track the entry. Simultaneous uploads require simultaneous record creation. Meanwhile, the contemporaneous distribution of the streams by different CDN servers involves simultaneous reading of the same records. Finally, the records and segments are deleted once the stream, especially a live stream, ends, is archived elsewhere, or is no longer accessible, wherein the deletion is typically based on a preconfigured expiration time. This overhead of tracking and timely deletion of stream segments could create bottlenecks in the streaming performance of the CDN especially as the number of streams supported by the CDN at any given time increases.

Additional hardware and other resources can be provisioned to offset the increased loads. This however comes at increased cost as well as increased overhead from reconfiguring the CDN servers to make use of the additional resources.

A central database can be used in conjunction with the central storage cluster to offload the management of the stream segments. The central database tracks which stream segments have been uploaded to the central storage cluster, and when they expire and should be deleted. In this scenario, the central database as well as the central storage cluster can become bottlenecks. The central database provides only limited scalability and supports the simultaneous management of a certain number of streams. Should the management demand for uploading and deleting stream segments exceed the threshold, the central database will be bottlenecked which can cause the central storage cluster to overflow or underperform.

Accordingly, there is a need to better optimize the existing set of resources of the central storage cluster. There is a need to decentralize and distribute some, if not all, of the overhead associated with managing the streams in the central storage cluster. In other words, there is a need to leverage the existing distributed infrastructure of the CDN PoPs and PoP servers to offload overhead from the central storage cluster, thereby allowing the central storage cluster to dedicate more resources and be more responsive to the uploading and downloading of streams and stream segments.

BRIEF DESCRIPTION OF THE DRAWINGS

A preferred embodiment for distributed management of live stream storage will now be described, by way of example only, with reference to the accompanying drawings in which.

DETAILED DESCRIPTION

This disclosure pertains to the distributed management of streaming content that is comprised of multiple segments. Each segment can be uniquely addressed via a URL (Universal Resource Locater) and can be independently transported to a client over a digital network, such as the Internet, for playback. The distributed management is implemented in a distributed platform having a centralized storage cluster for storing different streaming content, and more specifically, the stream segments of each streaming content, that are uploaded and redistributed through different nodes of the distributed platform.

In some embodiments, the distributed management involves offloading the overhead associated with managing segment expiration and deletion from the central storage cluster to the nodes of the distributed platform. The distributed management tracks segments based on their expiry time and executes the deletion logic across the nodes such that the central storage cluster is freed from such operations and is left to simply execute read, write, and deletion operations issued by the distributed nodes.

The distributed management is especially beneficially for live streaming content, whereby each segment of the live streaming content is written to the central storage cluster and retained in the central storage cluster for redistribution for a brief amount of time that the segment remains relevant before the segment is deleted. Each live stream is typically comprised of thousands of segments, and with several hundred simultaneous live streams, the logic and overhead for managing the deletion of the segments can become significant.

Figure 1:
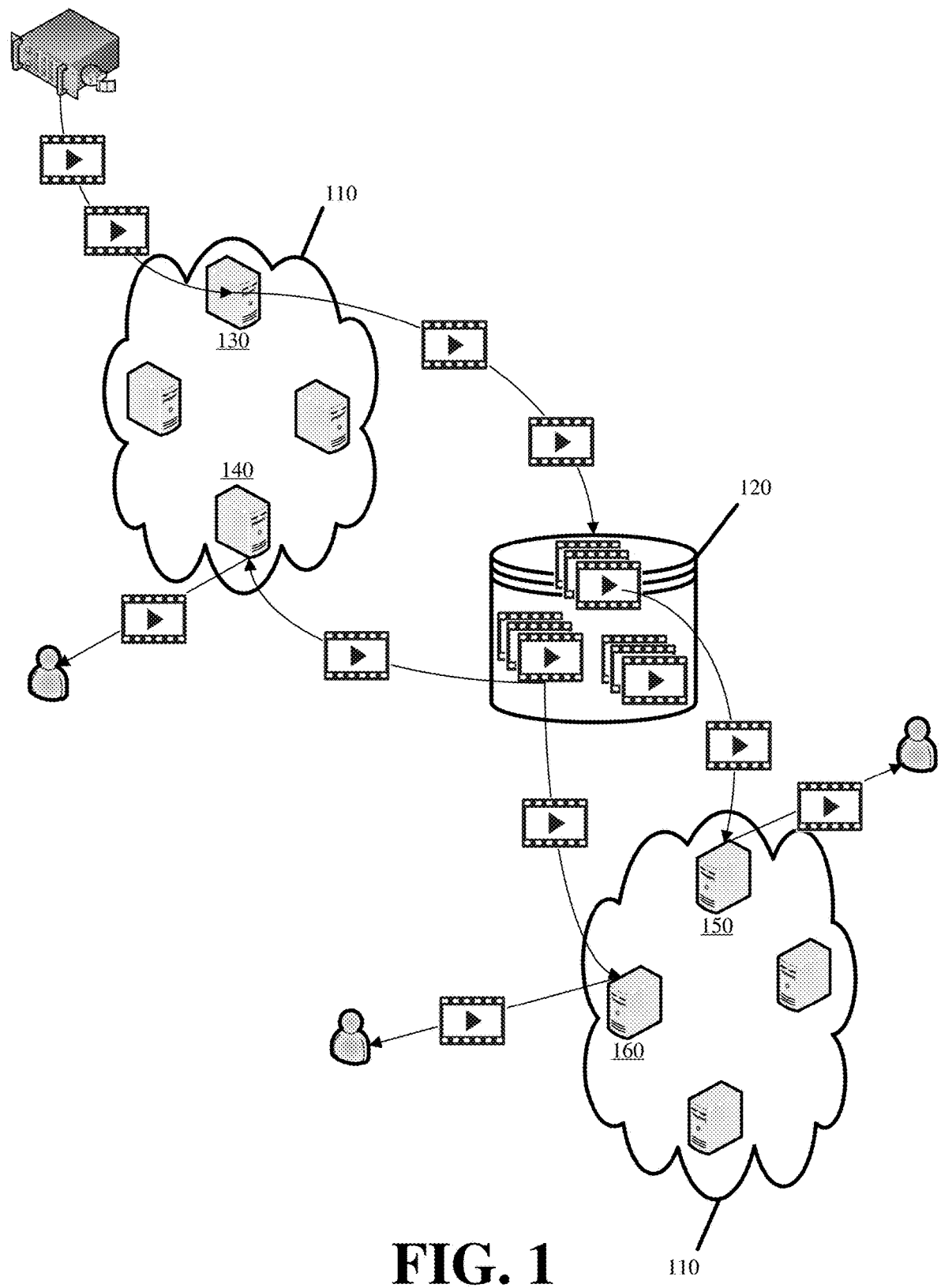
FIG. 1 conceptually illustrates a distributed platform architecture for implementing the distributed stream segment expiration and deletion management in accordance with some embodiments.

FIG. 1 conceptually illustrates a distributed platform architecture for implementing the distributed stream segment expiration and deletion management in accordance with some embodiments. The distributed platform is formed from multiple points-of-presence (PoPs) 110 and a central storage cluster 120.

The PoPs 110 are deployed to different geographic regions or network edges. Each PoP 110 includes one or more edge servers. The edge servers are the distributed platform's points of contact with external third parties including stream providers and users that request and playback the streams.

In this figure, edge server 130 receives streaming content from a streaming provider and uploads the streaming content to the central storage cluster 120. More specifically, edge server 130 receives the streaming content from a hardware or software encoder operated by the streaming provider. The edge server 130 can simultaneously receive and upload different streams to the central storage cluster 120. Streaming providers use the hardware or software encoders to encode their content into a digital format. Once in the digital format, the streaming content can be uploaded to the distributed platform through one of the distributed edge servers operated from one of the different geographically dispersed PoPs. The edge servers then upload the received streams to the central storage cluster 120.

Edge servers 140, 150, and 160 receive client requests for streaming content. These edge servers 140, 150, and 160 respond to the requests by retrieving the streaming content from the central storage cluster 120 and fanning out the retrieved streams to the requesting clients. Although not shown, the PoP servers 140, 150, and 160 can also serve other static or dynamic content or provide services on behalf of different service providers to requesting clients. Any edge server can also upload a first stream to the central storage cluster 120 while simultaneously downloading and serving a different second stream from the central storage cluster 120 to one or more users.

The central storage cluster 120 is a large array of volatile and/or non-volatile storage for simultaneously storing a large number of content streams. The storage array is provided by a large allocation of memory or disks with interfaces to one or more servers or machines. These machines are highly specialized and optimized for performing storage operations on the memory or disk and are highly efficient so as to handle several hundred or thousand simultaneous read and write operations. In some embodiments, the central storage cluster 120 is a Ceph storage cluster.

This distributed architecture optimizes the upload and redistribution of streaming content. The streaming providers and clients interface with the PoP that is closest to them or provides the fastest upload or download performance. The PoPs have high-bandwidth and high-quality network links to the central storage cluster. The edge servers in the PoPs can use these high-bandwidth and high-quality network links in order to upload and redistribute streams with greater performance and efficiency than if the streaming providers or clients were to interface directly with the more distant central storage cluster. Moreover, by restricting central storage cluster access to the PoPs, the distributed platform eliminates overhead associated with the larger number and changing set of streaming providers and clients continually establishing and terminating connections with the central storage cluster. In other words, the central storage cluster can maintain a relatively small number of persistent network connections to the PoPs, thereby eliminating the significant overhead associated with continually establishing and terminating network connections for each upload or download request. The distributed platform architecture of FIG. 1 is representative of a content delivery network (CDN).

Streaming content refers to digital media content having a temporal duration. The digital media content can include any mix of video, audio, graphics, text, or other content that plays for a duration. The streaming content is digitally encoded with an encoder. The encoding is typically performed by a software or hardware encoder of the streaming provider, although the distributed platform can perform the encoding on behalf of the streaming provider.

The encoding generates segments that each encode a short subset of the overall streaming content. These segments are stored within the central storage cluster of the distributed platform and are redistributed by the edge servers from the different PoPs to different clients for playback thereon. Playback requires a sequential and continuous transmission of the streaming content segments from the distributed platform to the client. Any delay, interruption, loss, or other error in serving any of the segments to a client because of degraded performance at the edge servers or the central storage cluster may result in buffering or interruption in the user experience and potential termination of the stream. Moreover, each streaming provider is typically allotted a certain amount of space on the central storage cluster. If old segments are not purged at the same rate at which new segments are uploaded, it is possible for the allotted amount of space for a streaming provider to fill, thereby preventing the streaming provider from uploading additional stream segments.

Figure 2:
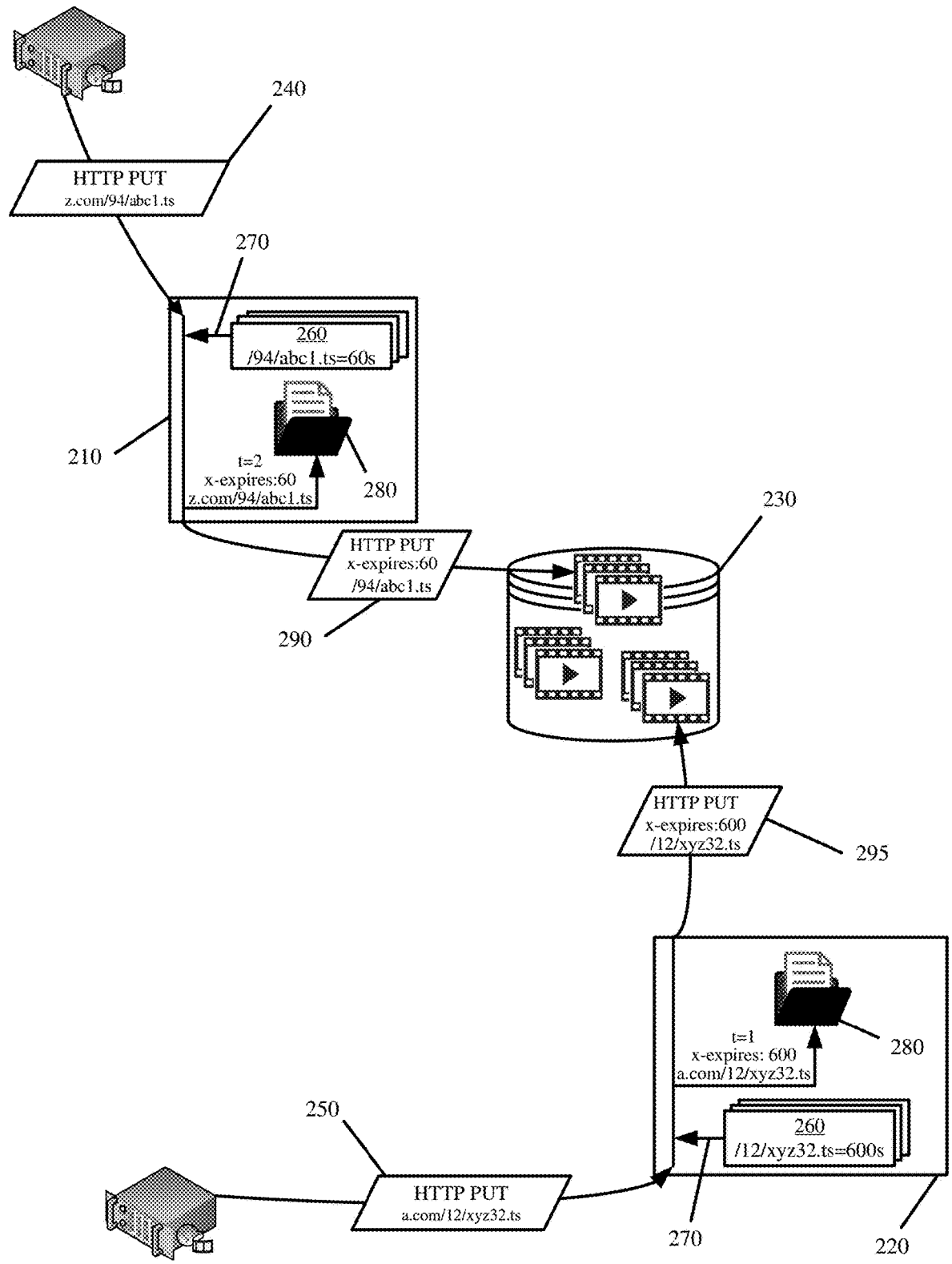
FIG. 2 conceptually illustrates the distributed segment expiration management in accordance with some embodiments.

FIG. 2 conceptually illustrates the distributed segment expiration management in accordance with some embodiments. FIG. 2 illustrates two edge servers 210 and 220 operating from two different distributed PoPs of the distributed platform. The edge servers 210 and 220 manage the segment expiration for the segments they uploaded to the central storage cluster 230. The edge servers 210 and 220 are the initial point of contact for the streaming providers that upload streams to the distributed platform for redistribution, and the clients that request to download and receive the uploaded streams from the distributed platform.

The edge servers 210 and 220 receive different live stream segments 240 and 250 from different streaming providers or encoders used by the streaming providers. In most HTTP based segmented streaming formats, the edge servers also receive manifest files, also referred to as playlist files, that include a list of most recently uploaded segments that are available to the client for playback. The live stream segments 240 and 250 are uploaded to the edge servers 210 and 220 with unique Uniform Resource Locators (URLs). In some embodiments, the stream providers upload the live stream segments using HyperText Transfer Protocol (HTTP) PUT or POST messages with each message specifying the URL for a segment.

Each edge server 210 and 220 obtains a different expiration configuration 260 for the stream segment being uploaded based on the uploaded segment URL. Each expiration configuration 260 specifies a different expiration time for the uploaded stream segment, wherein the expiration time sets how long the segment should be retained and made available from the central storage cluster 230 before expiration and removal from the central storage cluster 230. The streaming providers can create the expiration configurations. If an expiration configuration is not defined for an uploaded stream or segment, a default expiration time can be used. A streaming provider can create different expiration configurations for different streams or one expiration configuration with which to specify the expiration time for multiple streams uploaded by that streaming provider.

Each expiration configuration created by a stream provider is associated with a regular expression. The regular expression matches to different parts of the URL of one or more stream segments uploaded by the streaming provider. Accordingly, edge server 210 obtains the correct expiration configuration 260 for uploaded segment 240 by matching the URL from the received stream segment upload request to the regular expression associated with that expiration configuration. Similarly, edge server 220 obtains a different expiration configuration 260 for uploaded segment 250 by matching the URL from the received stream segment upload request to the regular expression associated with that expiration configuration.

The edge severs 210 and 220 modify the headers of the uploaded segments by inserting (at 270) the expiration time obtained from the expiration configuration 260 into the header. In some embodiments, the custom header is an extended or custom HTTP header, such as "x-expires: 600", wherein the value of 600 specifies the number of seconds to retain the segment in the central storage cluster. In some embodiments, the encoder uploading the stream segments can add the custom header with the expiration time. In some such cases, the edge server can detect the inclusion of the custom header with the expiration time in an uploaded stream segment and leave the custom header unmodified.

Each edge server 210 and 220 creates a log entry for the uploaded segment in a local log 280. Included with the log entry 280 is part or all of the segment URL identifying the segment, the expiration time from the expiration configuration, and a current timestamp. The local log 280 therefore tracks each stream segment that the corresponding edge server enters into the central storage cluster 230 along with the expiration time for each segment. Each edge server uploading segments to the central storage cluster 230 performs similar operations such that the collective expiration information for the segments entered into the central storage cluster 230 is distributed across the edge servers in the different PoPs rather than be centralized in the central storage cluster 230 or a central database.

The log entry creation is performed contemporaneous with the edge servers 210 and 220 forwarding the stream segments with the modified headers 290 and 295 to the central storage cluster 230. When forwarding the stream segments 290 and 295, the edge servers 210 and 220 can provide instruction for the central storage cluster to write or store the segments 290 and 295.

Figure 3:
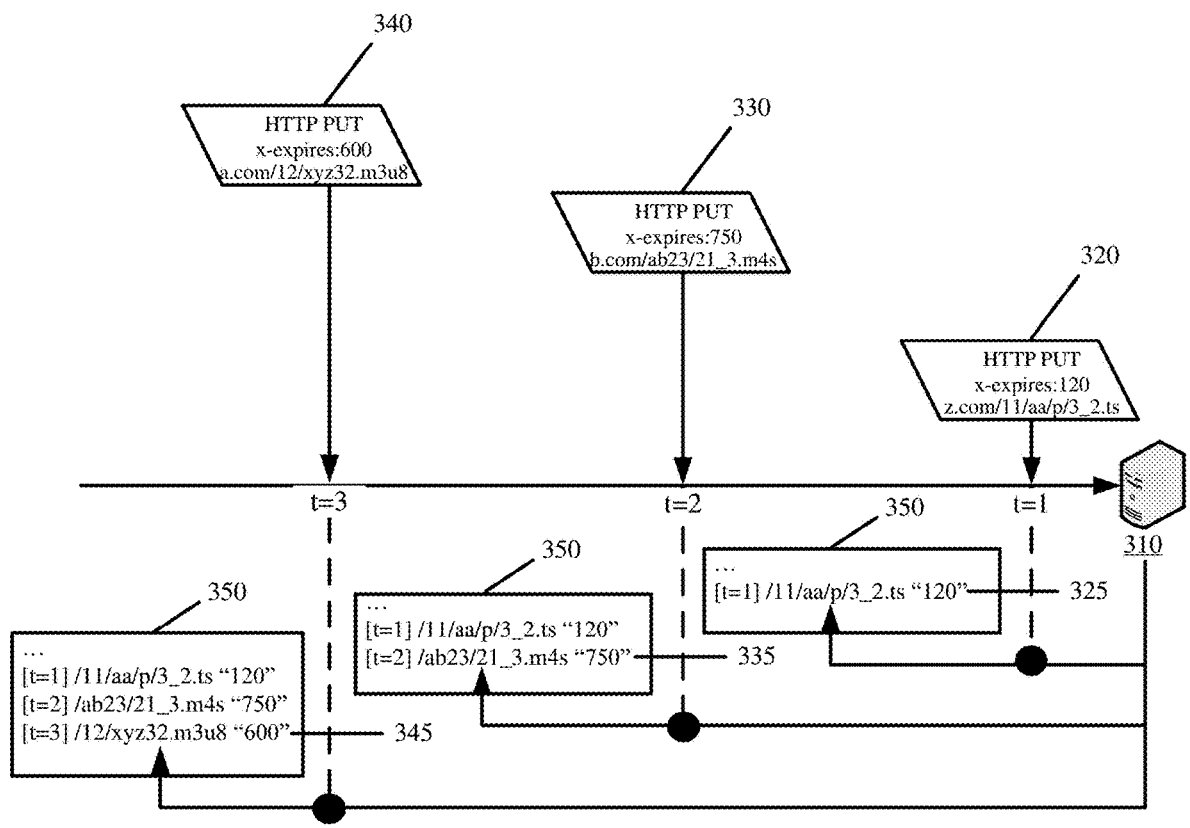
FIG. 3 conceptually illustrates an edge server of the distributed platform receiving segments for upload to the central storage cluster and log entries that are created for each segment in accordance with some embodiments.

FIG. 3 conceptually illustrates an edge server 310 of the distributed platform receiving segments 320, 330, and 340 for upload to the central storage cluster and log entries 325, 335, and 345 that are created for each segment in accordance with some embodiments. In this figure, the edge server 310 has already identified the expiration configuration for each segment 320, 330, and 340 and has inserted the expiration time into the header of each segment 320, 330, and 340. For each such segment 320, 330, and 340, the edge server 310 creates a respective entry 325, 335, and 345 in the log file 350 to track the log entry time (i.e., current time), the segment URL, and the expiration time. The segment URL can be the media absolute full URL or a path that is extracted from the segment URL.

The log entries can be created by executing a script on each edge server that detects a segment having an expiration time, opens the local log, and appends the information to the log. Alternatively, the edge servers can repurpose their existing request processing logic for log creation. In some such embodiments, an edge server generates a subrequest for each request it receives to upload a segment to the central storage cluster. The subrequest is issued locally on the edge server to generate the log entry and terminates at the local server without further processing.

Figure 4:
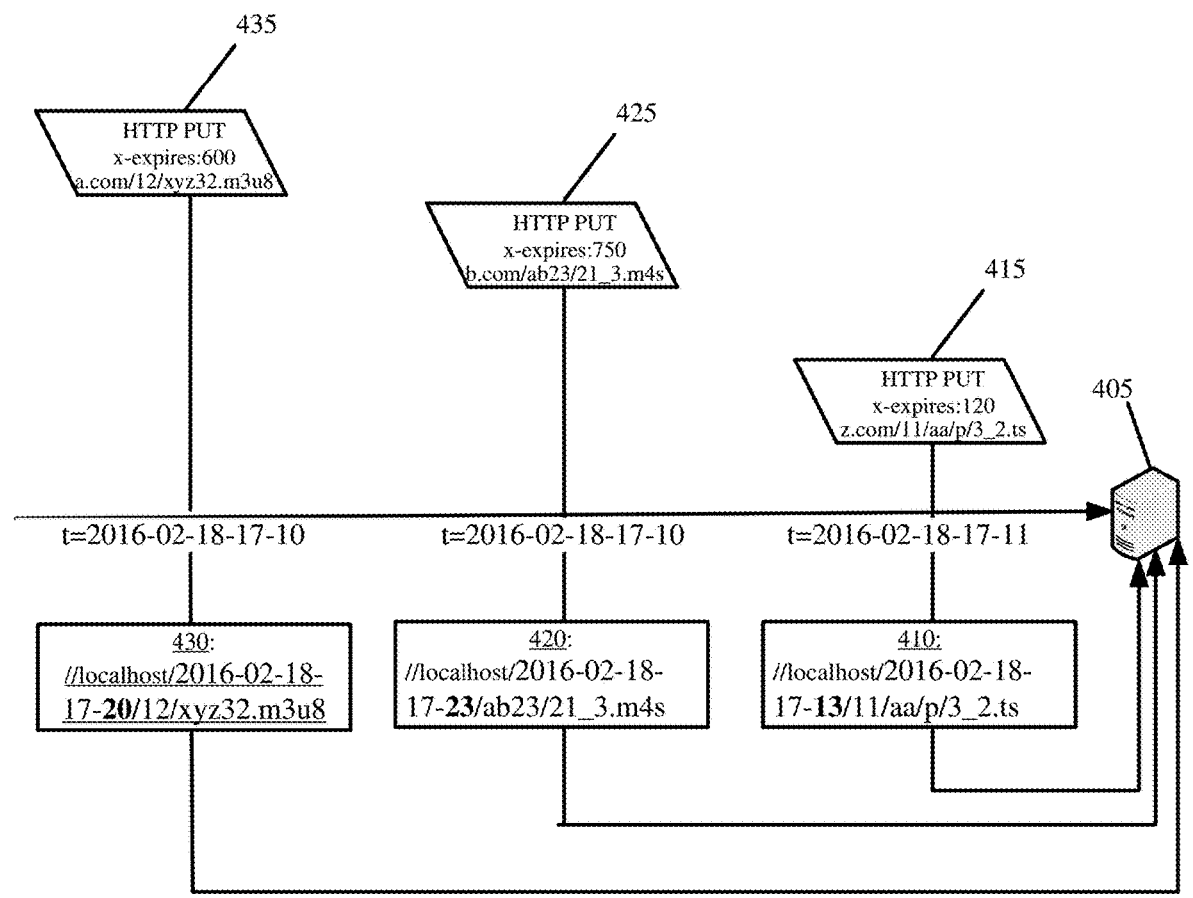
FIG. 4 illustrates subrequests with which to generate log entries for uploaded segments.

FIG. 4 illustrates subrequests 410, 420, 430 with which to generate log entries for uploaded segments 415, 425, and 435. The subrequests 410, 420, 430 are directed to the edge server (i.e., localhost) 405 rather than the central storage cluster. Moreover, the URL path of each original upload request is altered to include the expiration time for the segment directly within the URL path. In particular, the current timestamp is adjusted based on the expiration time of the corresponding segments, and the resulting expiration timestamp becomes a path of the subrequest URL. The subrequests 410, 420, 430 issued on the edge server fail and generate a 404 Not Found error condition because the segments 415, 425, 435 cannot be located on the edge server 405 at the altered URLs. Nevertheless, the error condition results in an entry being created in the local log of the edge server 405. Each log entry specifies the time of the error or current timestamp and the altered URL of the failed subrequest, wherein the altered URL contains the expiration time for the segment and the URL path where the segment is stored in the central storage cluster.

In the different embodiments, the expiration times as well as the segments uploaded by each particular edge server are tracked in the local log of the particular edge server. The local log is a file (e.g., plain text or encoded) stored on the file system of the edge server. This implementation eliminates the need for the edge servers to be configured with and run a database for expiration time and segment upload tracking purposes.

The local logs distribute the expiration management for the different segments uploaded to the central storage cluster across the edge servers of the distributed platform. The logic to delete the segments from the central storage cluster is similarly distributed across the edge servers of the distributed platform. In particular, some embodiments rely on a file system based implementation to identify previously uploaded segments in the local log that have expired and to delete the expired segments from the central storage cluster.

Figure 5:
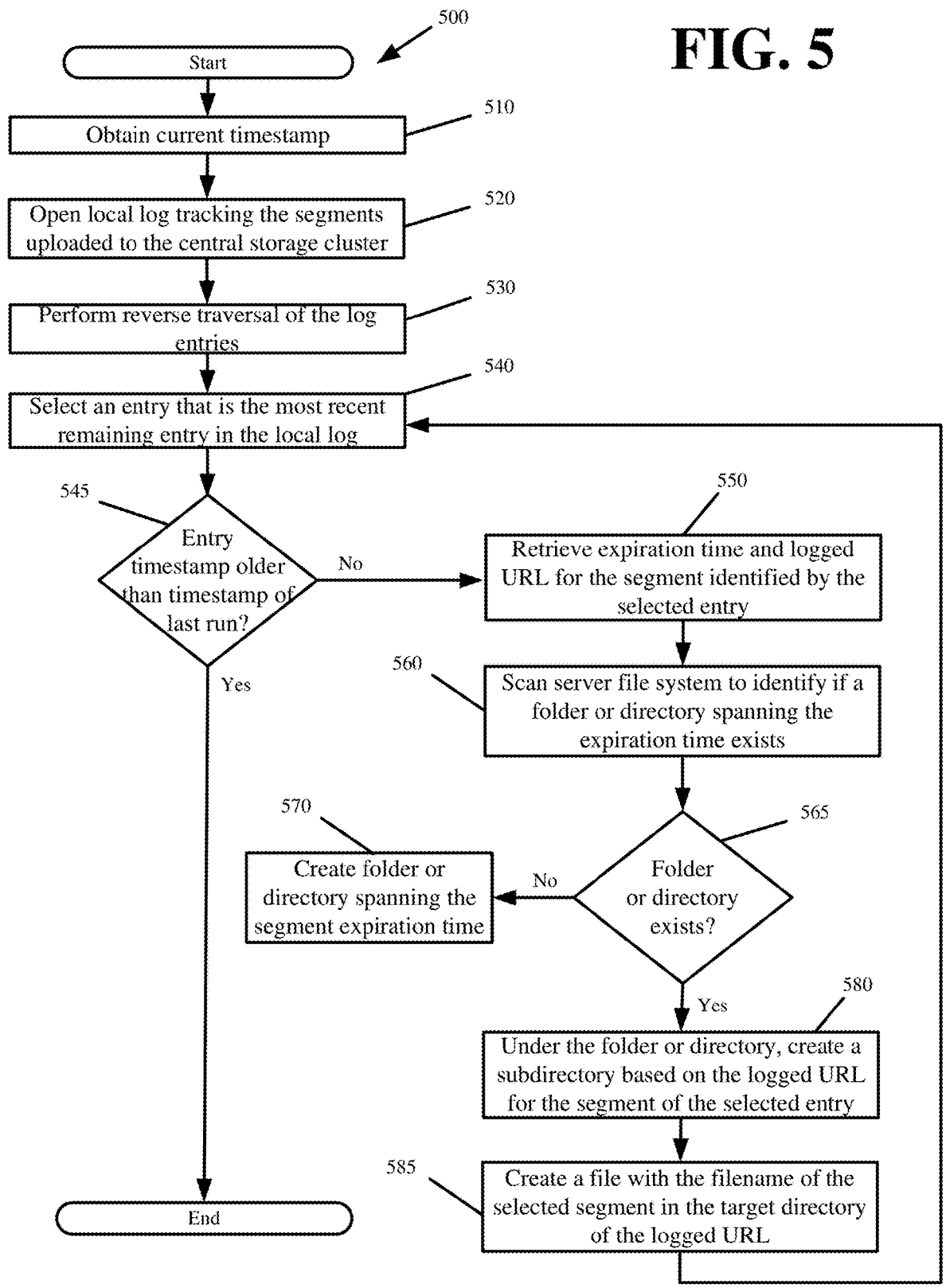
FIG. 5 presents a process for a file system implementation of some embodiments by which a distributed edge server identifies in the local log, segments that the edge server previously uploaded to the central storage cluster and that have expired.

FIG. 5 presents a process 500 for a file system based implementation of some embodiments by which a distributed edge server processes the local log, identifies segments that the edge server previously uploaded to the central storage cluster, and tracks the expiration of the segments. Process 500 is periodically performed by the edge server based on a configured cron job or other scheduled job, process, or task that periodically executes on the edge server and other edge servers of the distributed platform. For instance, process 500 may execute every five minutes.

The process obtains (at 510) a current timestamp, wherein the current timestamp specifies the time at which the process 500 commences. The process can alternatively obtain a timestamp for a later time at which deletion is desired.

The process opens (at 520) the local log tracking the segments uploaded by the edge server to the central storage cluster. The process performs (at 530) a reverse traversal of the log entries, wherein the reverse traversal involves accessing the most recent entries before entries that were created further in the past. Each entry is identified with a timestamp for when the entry was created. When entries are appended to the local log, the most recent entry is typically the last or bottommost entry in the log file.

In performing the reverse traversal, the process selects (at 540) an entry that is the most recent remaining entry in the local log. The process determines (at 545) whether the selected entry timestamp is older than the timestamp for when the process 500 was last executed.

In response to the entry timestamp being older than the timestamp for when the process 500 was last executed, the process ends. Thus, if process 500 is executed every five minutes, the log entries that were created more than five minutes before the current timestamp are not processed. The edge server thereby avoids processing the same log entries more than once.

In response to the entry timestamp not being older than the timestamp for when the process 500 was last executed, the process retrieves (at 550) the expiration time and logged URL for the segment identified by the selected entry. The process scans (at 560) the file system of the edge server and determines (at 565) based on the scanning, whether a folder or directory spanning the expiration time exists. The determination is based on the folder or directory names. Each folder or directory name may include a timestamp. The time gap between the timestamps in the names of two folders or directories with the closest timestamps is the interval for the expiration duration spanned by the folder having the latest timestamp. Each folder or directory name may instead specify a time interval for the expiration duration that is spanned. The interval of time spanned by each directory or folder can be keyed to the interval at which the edge server deletes expired segments from the central storage cluster or the interval at which the edge server performs process 500 (e.g., every 5 minutes). Alternatively, the interval of time spanned by each directory or folder can be a fixed bucket of time (e.g., 10 minutes). In any case, the file system folders are contiguous.

In response to the folder or directory spanning the expiration time not existing, the process creates (at 570) the folder or directory with a path or name spanning the expiration time on the file system. In response to identifying an existing folder or a newly created one spanning the expiration time for the selected segment, the process then creates various entries thereunder with which to track the expiration of the stream segments. In some embodiments, the process creates (at 580) a subdirectory or path based on the logged URL for the segment identified by the selected entry. The subdirectory is created under the directory with a path or name equal to the path in the selected entry URL without including the filename. The process then creates (at 585) a file with the filename of the selected segment in the target directory of the logged URL. The file size is typically zero bytes. In some other embodiments, the files can be created with names specifying the path section of the URL and the filename of a segment such that the sub-directory creation and step 580 can be avoided.

The process then reverts back to step 540. In particular, the process continues by selecting the next more recent entry in the log file until the timestamp of the selected entry is older than the timestamp for when the process 500 was last executed.

Figure 6:
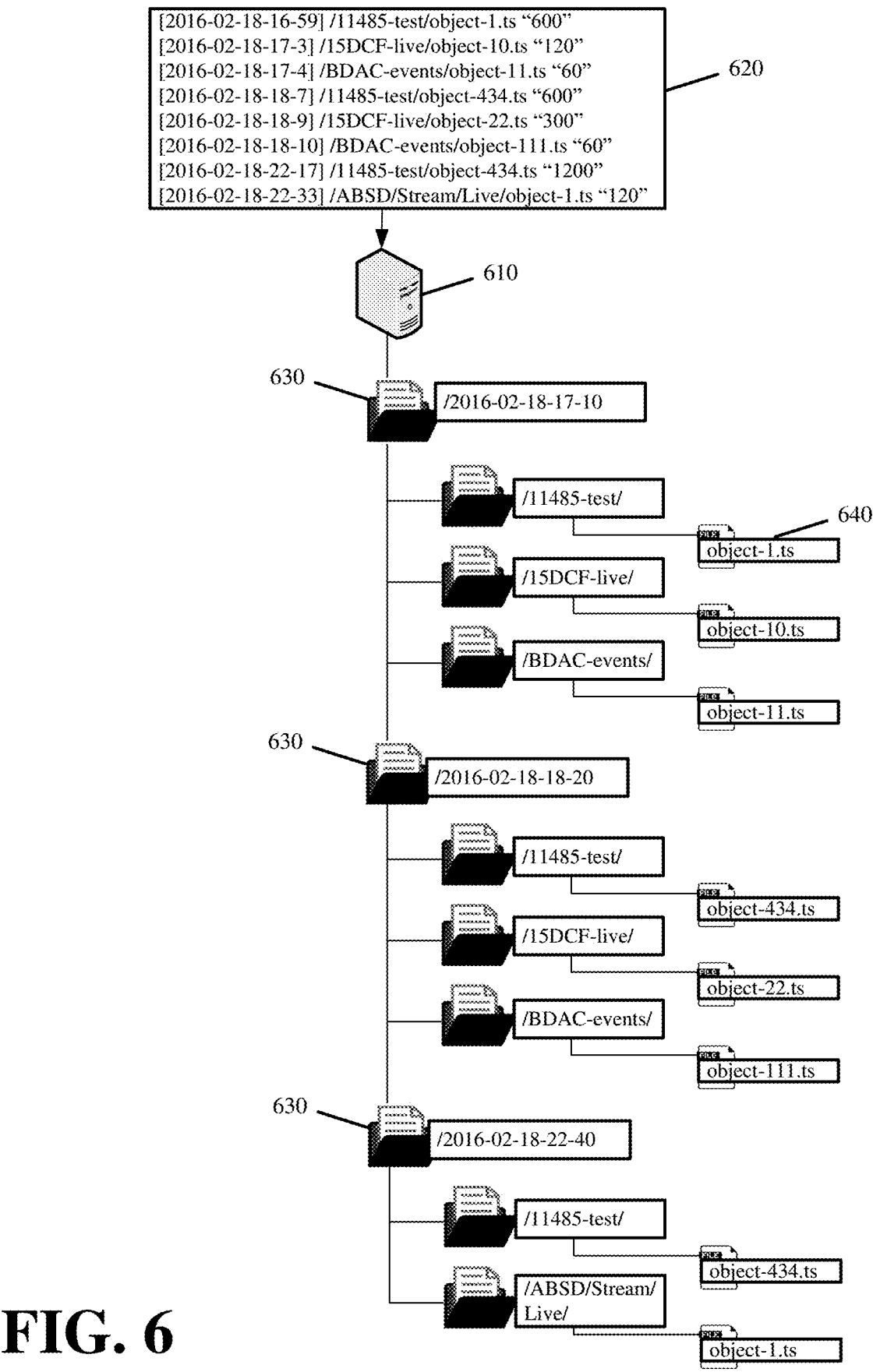
FIG. 6 conceptually illustrates managing different segments uploaded to the central cluster storage by an edge server and their corresponding expiration times with the file system of the edge server in accordance with some embodiments.

FIG. 6 conceptually illustrates managing different segments uploaded to the central cluster storage by an edge server 610 and their corresponding expiration times with the file system of the edge server 610 in accordance with some embodiments. The figure illustrates a log file 620 with several log entries for segments the edge server 610 previously uploaded to the central storage cluster. The figure also illustrates creating file system entries in the file system of the edge server 610 based on the expiration times and URLs of the log entries for the uploaded segments, wherein the first system entries include directories, sub-directories, and files each with different names.

As shown in FIG. 6, each directory within the first-tier of directories 630 is given a timestamp indicating the expiration interval that is spanned by that directory. For instance, the first first-tier directory has a timestamp of "/2016-02-18-17-10" and the second first-tier directory has a timestamp of "/2016-02-18-18-20". The timestamp of the second first-tier directory is later than the timestamp of the first first-tier directory. Accordingly, all segments that expire in the time between these two timestamps are entered as subdirectories and files under the second first-tier directory.

The edge server 610 parses entries from the log 620, determines the expiration time for each segment or entry based on adding the entry timestamp to the expiration time as one example, and creates the subdirectories using the URL paths of the log 620 entries. An empty file (i.e., 640) is then created under each subdirectory with the filename of the segment that is set to expire in the expiration interval defined by the first-tier directory.

In some embodiments, the sub-directories under the first-tier directories are not created. Instead, the files are created directly under the temporally relevant first-tier directories. In some such embodiments, the filename for each created file specifies the URL path of the log entry as well as the filename of the segment that is set to expire in the expiration interval defined by the first-tier directory under which the file is created.

Figure 7:
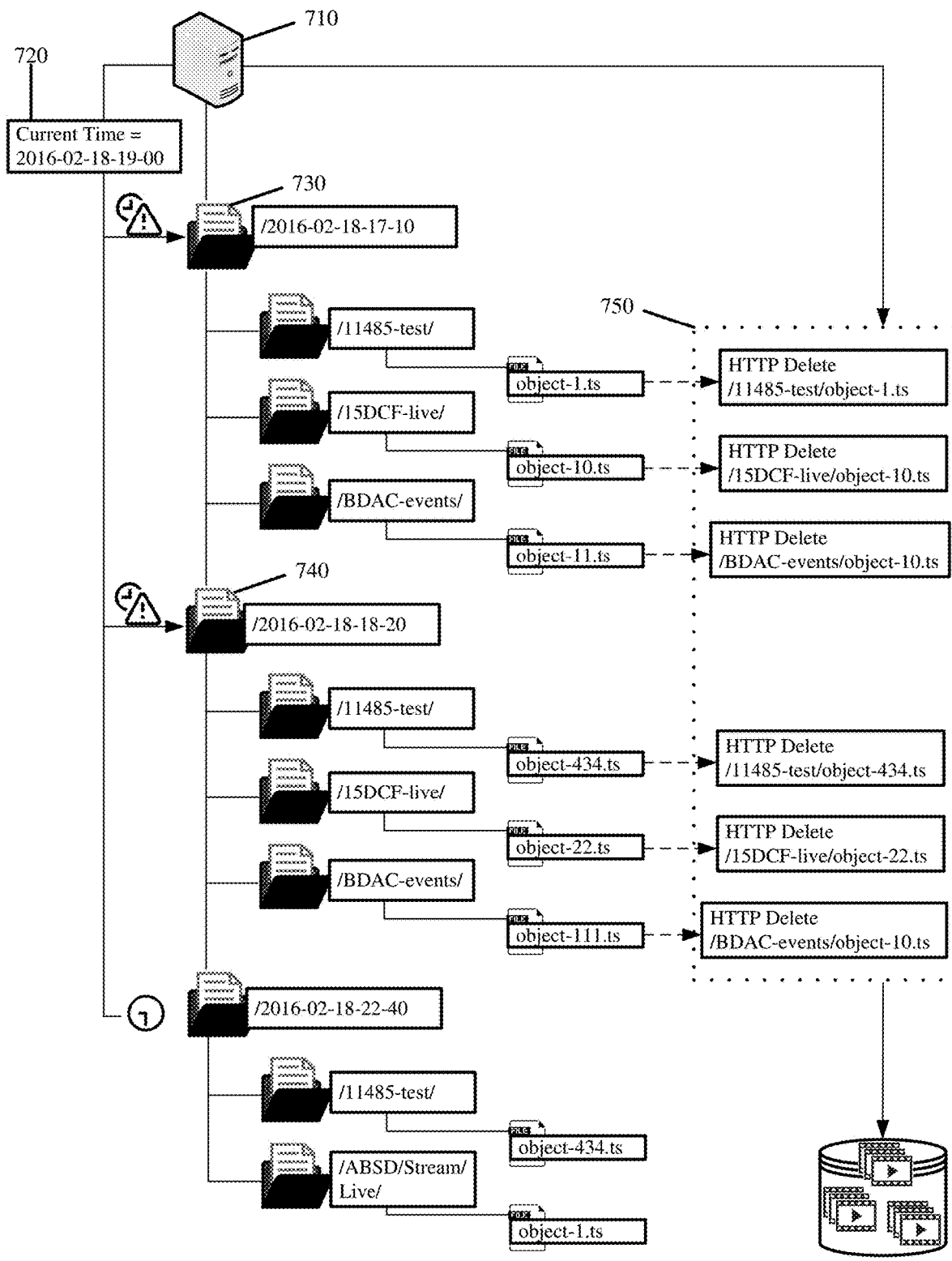
FIG. 7 conceptually illustrates performing the distributed deletion of stream segments with a particular edge server in accordance with some embodiments based on the file system management of the segments and the expiration times of the segments a particular edge server previously uploaded to the central storage cluster.

Periodically, the edge server performs a second cron job or other scheduled job, process, or task to leverage the file system management of the segments in performing the distributed deletion of stream segments from the central storage cluster. FIG. 7 conceptually illustrates performing the distributed deletion of stream segments with a particular edge server in accordance with some embodiments based on the file system management of the segments and the expiration times of the segments a particular edge server previously uploaded to the central storage cluster.

In FIG. 7, the edge server 710 obtains the current timestamp 720. A quick scan of the file system is made to identify a set of first-tier directories 730 and 740 with timestamps that are older than the current timestamp 720. In other words, the set of first-tier directories 730 and 740 contain the paths and filenames of segments that have been uploaded to the central storage cluster by the edge server 710 but that have expiration times older than the current timestamp 720. FIG. 7 illustrates the set of first-tier directories 730 and 740 as two of three directories created in the file system for tracking expiration of stream segments uploaded from the edge server 710 to the central storage cluster.

The edge server 710 accesses each of the directories 730 and 740 with the expired segments. Each subdirectory and file in the subdirectory is converted to a purge command 750 that the edge server 710 sends to the central storage cluster. Alternatively, when the file system management directly creates the files under directories 730 and 740, each filename from the files in the directories 730 and 740 is converted to a purge command.

Once each purge command is issued, the file used to create the purge command is deleted from the file system of the edge server 710 and if the subdirectory is empty, the subdirectory is also deleted. The edge server 710 continues until all subdirectories under the first directory 730 of the set of first-tier directories are deleted. The edge server 710 then deletes the first directory 730 of the set of first-tier directories and performs the same steps in deleting the segments identified by the subdirectories and files under the second directory 740 of the set of first-tier directories.

In some embodiments, the edge server sends individual HTTP DELETE request methods to the central storage cluster for each segment that is to be deleted from the central storage cluster. The HTTP DELETE URL is formed directly from the subdirectory and filename or just the filename found in the file system of the edge server.

In response to the purge instructions or the HTTP DELETE request methods from the different edge servers, the central storage cluster removes the identified segments from memory or storage. An acknowledgement can be returned to the respective edge server to confirm the actual deletion of the segments.

In this manner, the central storage cluster merely reads, writes, and deletes as instructed by the distributed platform edge servers with the edge servers managing the overhead as to when and what should be written to or read from the central storage cluster including which segments to delete and when in this distributed manner. There is no reading or scanning of the central storage cluster to periodically identify the expired segments. The distributed management also eliminates the need for the central storage cluster to separately write expiration information, timestamps, or other metadata associated with segment management when storing the segments.

Some embodiments modify the distributed platform architecture for redundancy and failover in the management of the stream segments. The redundancy and failover preserve the segment expiration information for segments uploaded to the central storage cluster in the event that the edge server that uploaded the segments experiences a failure.

Figure 8:
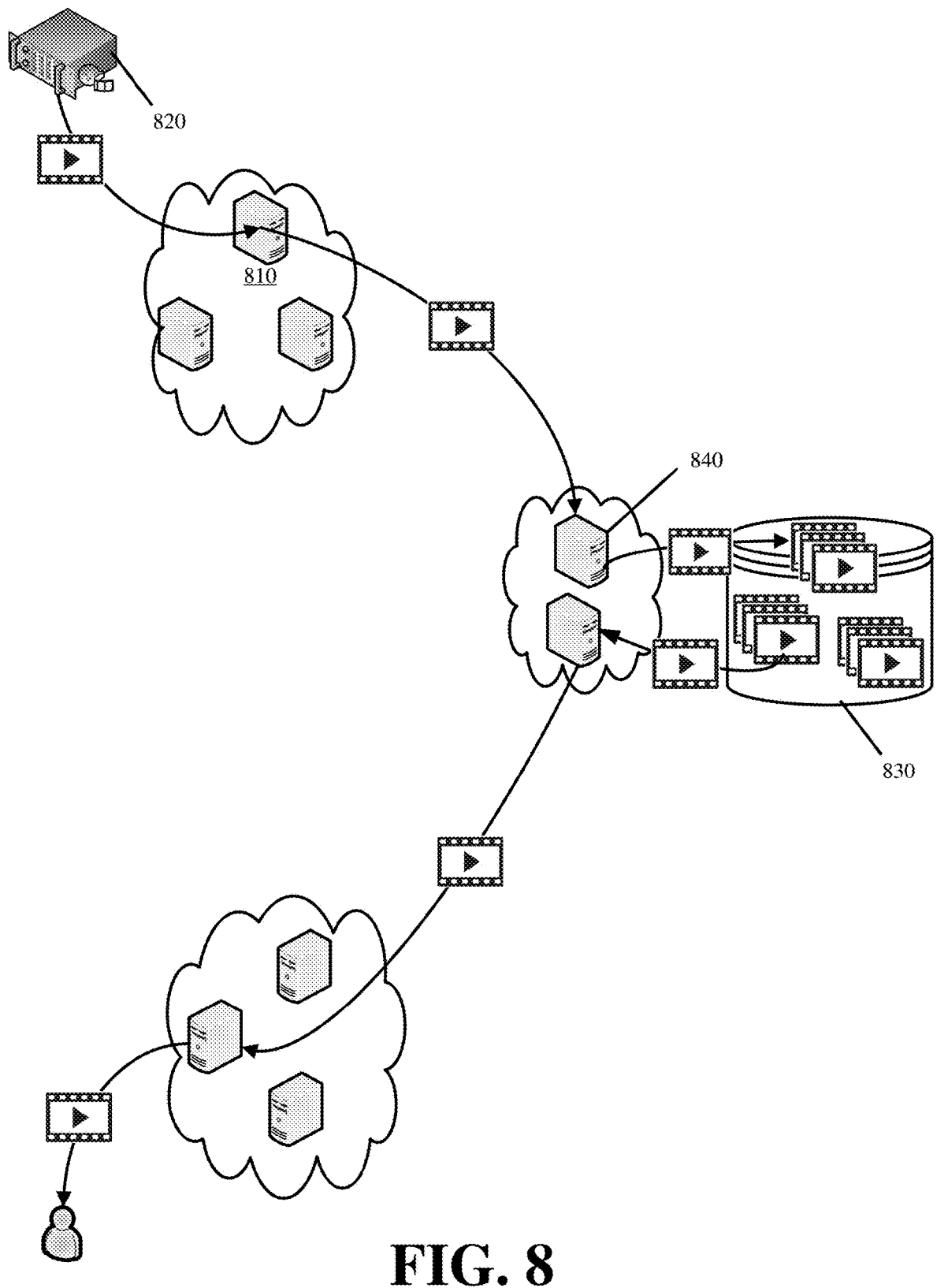
FIG. 8 illustrates a two-tier hierarchical arrangement of servers for distributed management and uploading of stream segments to a central storage cluster in accordance with some embodiments.

The modified distributed platform architecture sets forth a hierarchical arrangement of the PoPs and edge servers. In some embodiments, a two-tier hierarchical arrangement is provided for the servers and the uploading of stream segments to the central storage cluster. Some other embodiments modify the distributed platform architecture with additional hierarchical tiers. FIG. 8 illustrates a two-tier hierarchical arrangement of servers for distributed management and uploading of stream segments to a central storage cluster in accordance with some embodiments.

In this figure, edge server 810 is a first-tier server that receives live stream segments from an encoder 820. In other words, the edge server 810 is the initial point of contact for the stream provider or encoder to the distributed platform. The edge server 810 can similarly be the initial point of contact for a client requesting content or streams from the distributed platform.

The edge server 810 does not directly forward the stream segments to the central storage cluster 830. Instead, a gateway server 840 separates the edge server 810 and other edge servers operating in the same or different PoPs from the central storage cluster 830. In some embodiments, any edge server can function as either an edge server or a gateway server. Alternatively, new PoPs containing the gateway servers can be deployed to strategic locations that are geographically more proximate to the central storage cluster 830 than the PoPs with the edge servers.

The edge servers function in a similar capacity as the servers performing process 500 above. As before, the edge servers insert the custom header to each request for a segment that is being uploaded. Each edge server also creates the local log entries and tracks the expiration of uploaded segments using the file system arrangement described with references to FIGS. 6 and 7. However, the segments are uploaded to at least one designated gateway server.

The gateway servers also operate in a similar capacity as the edge servers. Instead of directly receiving upload stream segments from stream providers or encoders, each gateway server receives uploaded stream segments from a subset of the edge servers. The gateway servers identify the uploaded segments based on the presence of the custom header. In some embodiments, each gateway server creates its own local log entries similar to the edge servers, wherein the local log entries track uploaded segments that pass through that gateway server including the segment URL, timestamp for the upload time, and expiration time. In some other embodiments, each gateway server has a database with which it tracks uploaded segments to the central storage cluster and the expiration of those segments. Each gateway server funnels uploaded segments from a subset of the edge servers to the central storage cluster. This two-tier hierarchy further reduces the number of concurrent network connections that are established with the central storage cluster as the connections are reduced to those between the lesser number of gateway servers and the central storage cluster as opposed to the greater number of edge servers and the central storage cluster.

The edge servers and the gateway servers concurrently manage expiration and removal of the uploaded segments. The gateway servers therefore add a second distributed management layer to supplement the first distributed management layer of the edge servers. Thus, if a particular edge server fails, the gateway server that received the uploaded stream segments from that particular edge server can take over and manage the expiration and deletion of those uploaded stream segments. Similarly, if the gateway server was to fail, the one or more edge servers uploading stream segments to the central storage cluster through that gateway server can continue to manage the expiration and deletion of those stream segments.

In this two-tier architecture, the edge servers and the gateway servers perform the periodic job to identify and delete expired segments. Both sets of servers can send the HTTP DELETE or other purge instructions to the central storage cluster. Redundantly issuing the purge instructions has no significant impact on the performance of the central storage cluster.

Some embodiments provide redundancy and failover for the distributed management of stream segment expiration and deletion at playback. In some such embodiments, user or client requests for live stream segments route to an optimal edge server. The optimal edge server is typically the edge server that is closest to the physical location of the requesting client in terms of latency or network hops. In response to a client request, the optimal edge server retrieves the requested live stream segment from local cache, a gateway server, or the central storage cluster.

Upon obtaining the requested stream segment, the optimal edge server verifies the segment validity to ensure that it has not expired. The verification is performed by comparing the current time to the expiration time and the last modified segment time that were added to the header of the segment by an edge server uploading the segment to the central storage cluster.

In response to verifying validity of the obtained segment, the optimal edge server serves the requested segment to the requesting client. Otherwise the segment has expired and is no longer valid. In this case, the optimal edge server issues an HTTP DELETE to the central storage cluster to ensure the expired segment is purged. This playback deletion provides additional redundancy in the event that the uploading server fails and does not delete one or more segments after they expire.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 9:
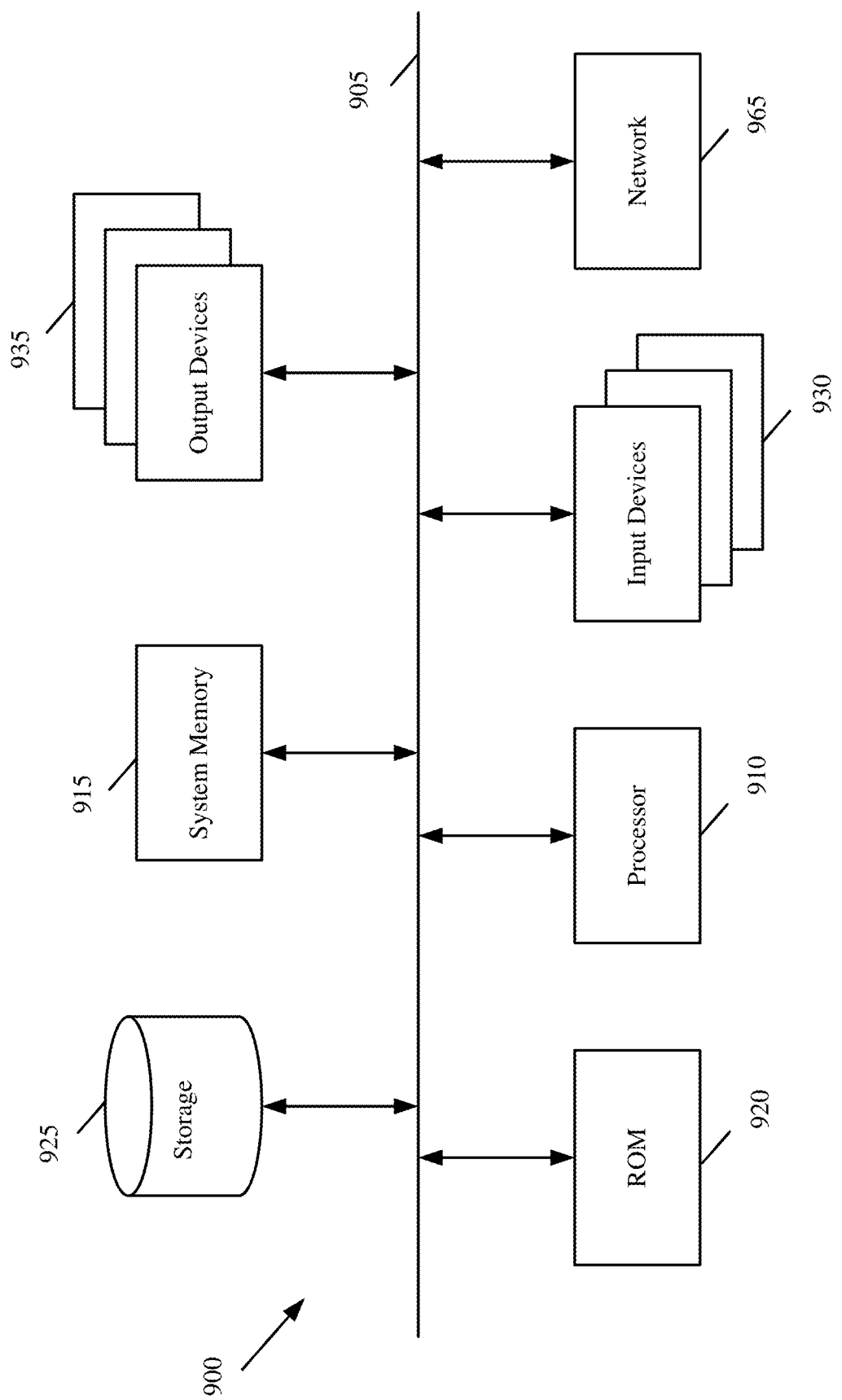
FIG. 9 illustrates a computer system or server with which some embodiments are implemented.

FIG. 9 illustrates a computer system or server with which some embodiments are implemented. Such a computer system includes various types of computer-readable mediums and interfaces for various other types of computer-readable mediums that implement the various methods and machines described above (e.g., PoP server, edge server, gateway server, central storage cluster machines, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device. Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    uploading a plurality of stream segments with different expiration times from a particular edge server to a central storage cluster, wherein the plurality of stream segments become available for redistribution from the central storage cluster by a plurality of edge servers after completing said uploading;
    creating on a file system of the particular edge server, a set of first-tier directories based on the different expiration times, wherein each first-tier directory of the first set of first-tier directories spans an interval covering the expiration time of at least one stream segment from the plurality of stream segments;
    creating on the file system, at least one entry under each directory of the set of first-tier directories, the entry under a particular first-tier directory comprising a name specifying a path corresponding to a Uniform Resource Locator (URL) of a particular stream segment from the plurality of stream segments with the expiration time of the particular stream segment expiring during the interval spanned by the particular first-tier directory, wherein said entry is a file with said name or a sub-directory with said name; and
    purging from the central storage cluster, a subset of the plurality of stream segments based on the interval spanned by the particular first-tier directory being older than a current timestamp and the particular first-tier directory comprising one or more entries with names specifying the URL for each stream segment of the subset of stream segments.

2. The method of claim 1 further comprising populating a log file at the particular edge server in response to uploading said plurality of stream segments, wherein producing the log file comprises creating an entry in the log file for each stream segment that the particular edge server uploads to the central storage cluster, said entry comprising the URL and the expiration time of the stream segment.

3. The method of claim 2, wherein creating the set of first-tier directories comprises periodically scanning the log file and converting one or more entries from the log file into different first-tier directories that span the expiration times of the entries.

4. The method of claim 1 further comprising generating at the particular edge server, a first purge instruction comprising a first URL mapping to a first entry under the particular first-tier directory, and a second purge instruction comprising a second URL mapping to a second entry under the particular first-tier directory.

5. The method of claim 4, wherein said purging comprises sending the first purge instruction and the second purge instruction from the particular edge server to the central storage cluster.

6. The method of claim 5, wherein the first purge instruction comprises a first HyperText Transfer Protocol (HTTP) DELETE request method, and the second purge instruction comprises a second HTTP DELETE request method.

7. The method of claim 1 further comprising retrieving a first expiration configuration based on the URL of a first stream segment, and retrieving a second expiration configuration based on the URL of a second stream segment.

8. The method of claim 7, wherein the first expiration configuration sets the expiration time for the first stream segment, and the second expiration configuration sets the expiration time for the second stream segment, and wherein the first expiration configuration is defined by a first stream provider originating the first stream segment, and the second expiration configuration is defined by a different second stream provider originating the second stream segment.

9. The method of claim 1, wherein said uploading comprises modifying a header of each stream segment of the plurality of stream segments by inserting the expiration time of the stream segment in the header before sending the plurality of stream segments to the central storage cluster.

10. A system comprising:
    a central storage cluster comprising a plurality of storage media storing a plurality of stream segments; and
    a plurality of edge servers distributed to a plurality of locations, each edge server of the plurality of edge servers comprising one or more processors, a network interface, a file system, and a log file, wherein the one or more processors of each particular edge server of the plurality of edge servers are configured to:
        track to the log file, an identifier and an expiration time for each of a specific subset of the plurality of stream segments received by the particular edge server, wherein the log file comprises a plurality of entries identifying the specific subset of stream segments, and the expiration time for each stream segment of the specific subset of stream segments;
        upload each segment of the specific subset of stream segments to the central storage cluster via the network interface while performing said tracking of the expiration time of each segment uploaded to the central storage cluster;
        update the file system with a set of first-tier directories and at least one subdirectory under each directory of the set of first-tier directories based on the log file, wherein each first-tier directory of the set of first-tier directories spans an interval covering the expiration time of at least one stream segment from the subset of stream segments uploaded by the particular edge server to the central storage cluster, and wherein each subdirectory under a particular first-tier directory comprises a path corresponding to a Uniform Resource Locator (URL) of a stream segment from the subset of stream segments with the expiration time of the stream segment expiring during the interval spanned by the particular first-tier directory; and
        delete a particular stream segment of the specific subset of stream segments from the central storage cluster by issuing a purge instruction with the identifier of the particular stream segment via the interface to the central storage cluster in response to tracking the expiration time set for the particular segment at the particular edge server being older than a current timestamp.

11. The system of claim 10, wherein each edge server of the plurality of edge servers sends different purge messaging to the central storage cluster, the different purge messaging initiating deletion of one or more stream segments from a subset of stream segments uploaded by that edge server to the central storage cluster that have expired.

12. A device comprising:
one or more processors configured to:
upload a plurality of stream segments with different expiration times to a central storage cluster, wherein the plurality of stream segments become available for redistribution from the central storage cluster by a plurality of servers after completing said upload;
create a set of first-tier directories based on the different expiration times, wherein each first-tier directory of the first set of first-tier directories spans an interval covering the expiration time of at least one stream segment from the plurality of stream segments;
create at least one entry under each directory of the set of first-tier directories, the entry under a particular first-tier directory comprising a name specifying a path corresponding to a Uniform Resource Locator (URL) of a particular stream segment from the plurality of stream segments with the expiration time of the particular stream segment expiring during the interval spanned by the particular first-tier directory, wherein said entry is a file with said name or a sub-directory with said name; and
purge from the central storage cluster, a subset of the plurality of stream segments based on the interval spanned by the particular first-tier directory being older than a current timestamp and the particular first-tier directory comprising one or more entries with names specifying the URL for each stream segment of the subset of stream segments.

* * * * *